United States Patent
Ueno

(10) Patent No.: US 9,540,807 B2
(45) Date of Patent: Jan. 10, 2017

(54) STRUCTURE VIBRATION CONTROL DEVICE

(71) Applicant: CHIHIRO SANGYO CO., LTD., Shizuoka (JP)

(72) Inventor: Hiroshi Ueno, Shizuoka (JP)

(73) Assignee: CHIHIRO SANGYO CO., LTD., Shizuoka (JP)

( * ) Notice: Subject to any disclaimer, the term of this patent is extended or adjusted under 35 U.S.C. 154(b) by 0 days.

(21) Appl. No.: 14/626,173

(22) Filed: Feb. 19, 2015

(65) Prior Publication Data
US 2015/0233113 A1    Aug. 20, 2015

(30) Foreign Application Priority Data

Feb. 19, 2014  (JP) ................................ 2014-029673
Oct. 31, 2014  (JP) ................................ 2014-223389

(51) Int. Cl.
*E04B 1/98*    (2006.01)
*F16F 9/19*    (2006.01)
(Continued)

(52) U.S. Cl.
CPC ................ *E04B 1/98* (2013.01); *F16F 9/061* (2013.01); *F16F 9/19* (2013.01); *F16F 13/007* (2013.01); *F16F 15/022* (2013.01)

(58) Field of Classification Search
CPC ............ E04H 9/02; E04H 9/021; E04H 9/027; E04H 9/028; E04B 2009/026; E04B 1/98; F16F 9/19; F16F 15/022; F16F 13/007; F16F 9/061
(Continued)

(56) References Cited

U.S. PATENT DOCUMENTS 4,895,229 A    1/1990   Kato
4,922,667 A *  5/1990   Kobori .................... E02D 27/34
                                                    52/167.2
(Continued)

FOREIGN PATENT DOCUMENTS

EP    0 807 767      11/1997
JP    58-94929        6/1983
(Continued)

OTHER PUBLICATIONS

Extended European Search Report issued Jul. 30, 2015 in corresponding European Patent Application No. 15154991.2.

*Primary Examiner* — Joshua J Michener
*Assistant Examiner* — Alp Akbasli
(74) *Attorney, Agent, or Firm* — Wenderoth, Lind & Ponack, L.L.P.

(57) ABSTRACT

A structure vibration control device includes a hydraulic damper having damping force characteristics that vary in response to a magnitude of an earthquake and having characteristics that are maintained for a long period of time regardless of an environmental temperature change. The hydraulic damper includes a preload chamber into which a high-pressure gas is charged in series with a hydraulic chamber. The preload chamber absorbs a volume change of the hydraulic chamber caused by the environmental temperature change and a piston rod and balances a bias force of a spring within the hydraulic chamber and of the preload chamber. Piston valves have high damping force characteristics against a weak earthquake and low damping force characteristics against a strong earthquake. The piston valves may include an orifice beside a check valve function, by which the high damping force characteristics lie within a range of 150 to 800 kN/(m/sec).

12 Claims, 12 Drawing Sheets

(51) Int. Cl.
*F16F 15/02* (2006.01)
*F16F 13/00* (2006.01)
*F16F 9/06* (2006.01)

(58) Field of Classification Search
USPC .......... 52/167.3, 657; 267/34, 64.12, 69, 70, 267/120; 188/282.5, 322.15, 322.22
See application file for complete search history.

(56) References Cited

U.S. PATENT DOCUMENTS

| | | | | |
|---|---|---|---|---|
| 4,971,181 A * | 11/1990 | Zaenglein | ............ | F16F 9/3271 137/543.17 |
| 5,058,868 A * | 10/1991 | Sirven | ............ | B60G 17/08 188/313 |
| 5,462,141 A * | 10/1995 | Taylor | ............ | E04H 9/02 188/280 |
| 5,491,938 A * | 2/1996 | Niwa | ............ | E04H 9/02 52/167.1 |
| 5,727,663 A * | 3/1998 | Taylor | ............ | E04H 9/02 188/280 |
| 5,934,028 A * | 8/1999 | Taylor | ............ | E04H 9/02 248/632 |
| 6,053,486 A * | 4/2000 | Schuitema | ............ | F16F 9/061 188/269 |
| 6,276,499 B1 * | 8/2001 | Satou | ............ | F16F 9/3484 188/282.5 |
| 6,324,794 B1 * | 12/2001 | Clinard | ............ | E04H 9/02 52/1 |
| 6,397,528 B1 * | 6/2002 | Rahimian | ............ | E04H 9/02 52/167.1 |
| 6,405,493 B1 * | 6/2002 | Taylor | ............ | E04H 9/02 52/167.1 |
| 6,425,245 B1 * | 7/2002 | Attard | ............ | B60T 11/16 60/589 |
| 6,966,154 B1 * | 11/2005 | Bierwirth | ............ | E02D 27/34 33/391 |
| 2002/0152790 A1 | 10/2002 | Kelm et al. | | |
| 2005/0173213 A1 * | 8/2005 | Coquet | ............ | F16F 9/44 188/322.13 |
| 2009/0194921 A1 * | 8/2009 | Smith | ............ | F16F 9/20 267/141.1 |
| 2010/0078275 A1 | 4/2010 | Kazmirski et al. | | |
| 2010/0163356 A1 | 7/2010 | Hennecke et al. | | |
| 2014/0116825 A1 * | 5/2014 | Lindeman | ............ | F16F 9/464 188/266.2 |

FOREIGN PATENT DOCUMENTS

| | | |
|---|---|---|
| JP | 6-346625 | 12/1994 |
| JP | 10-227145 | 8/1998 |
| JP | 2000-54677 | 2/2000 |
| JP | 2002-195339 | 7/2002 |
| JP | 2004-125023 | 4/2004 |
| JP | 2004-513786 | 5/2004 |
| JP | 2007-71367 | 3/2007 |
| JP | 2009-133381 | 6/2009 |
| JP | 2010-529375 | 8/2010 |
| JP | 2011-64285 | 3/2011 |
| JP | 2012-503751 | 2/2012 |
| JP | 2013-72509 | 4/2013 |
| JP | 2013-122255 | 6/2013 |
| JP | 2013-155841 | 8/2013 |
| JP | 2014-15994 | 1/2014 |

* cited by examiner

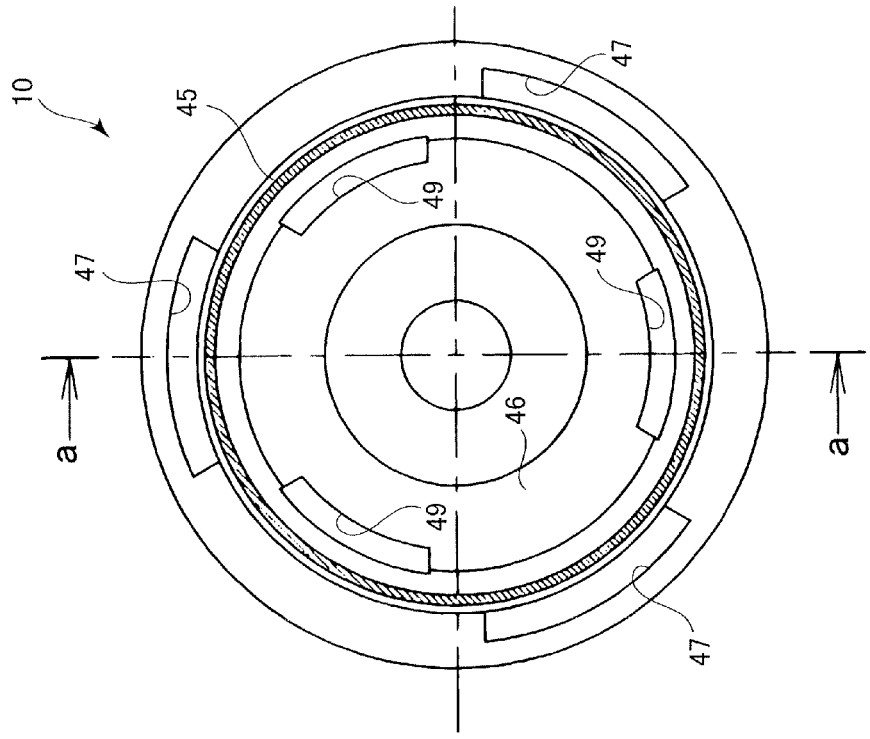
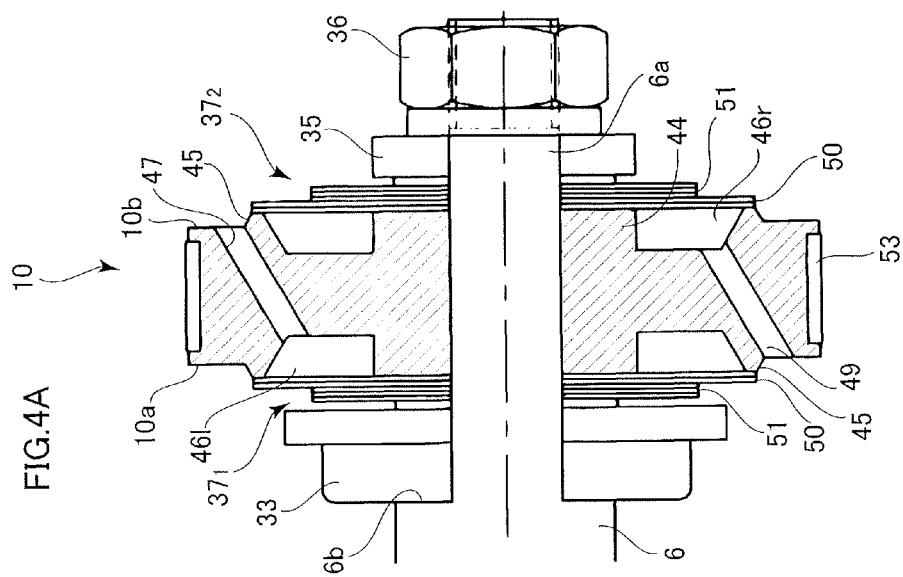
FIG.4A
FIG.4B

STRUCTURE VIBRATION CONTROL DEVICE

CROSS-REFERENCE TO RELATED APPLICATIONS

This application claims the benefit of Japanese Patent Application No. 2014-029673, filed on Feb. 19, 2014, and Japanese Application No. 2014-223389, filed on Oct. 31, 2014. These applications are hereby incorporated by reference herein in their entirety.

BACKGROUND OF THE INVENTION

Field of the Invention

The present invention relates to a vibration control device attached aslant between two structural members such as a pillar and a beam of a structure to suppress vibrations of the structure when an earthquake hits.

Description of the Related Art

Hitherto, there is known a structure vibration control device using a hydraulic damper as disclosed in Japanese Patent Application Nos. H06-346625, H10-227145, and 2000-54677, for example. The hydraulic damper described above includes a cylinder configured such that a hydraulic chamber formed therein is partitioned by a piston into oil chambers and a piston rod is inserted through wall surfaces provided at both ends of the hydraulic chamber. The hydraulic damper constitutes a brace damper by diagonally connecting a piston rod side to one structural member and a cylinder side to another structural member, and damps vibrations of the structure caused by an earthquake by circulating viscous fluid (oil) of both oil chambers through a restricted oil passage.

Because the piston rod penetrates through the hydraulic chamber, no volumetric change occurs in the hydraulic chamber even if the piston rod is moved.

The hydraulic damper described above installed on a wall surface, within an attic or the like of a building is liable to be affected by atmospheric temperature and sun radiation and its ambient temperature ranges from below zero to 50° C. The hydraulic damper is also exposed to annual variations of spring, summer, autumn and winter and daily variations of day time and night time. The variation of ambient temperature affects the oil (viscous fluid) filled in the hydraulic chamber of the hydraulic damper, and the oil repeats expansion and contraction.

The hydraulic damper described above is constructed such that no volume change occurs in the hydraulic chamber by the move of the piston rod as described above and such that the volume of the hydraulic chamber formed of the cylinder and the both end wall surfaces is invariant. Due to that, if the oil expands/contracts due to the temperature variation, pressure of the oil in the hydraulic chamber largely varies and acts on sealing of the wall surfaces through which the piston rod is slidably and fittingly inserted. Then, there is a possibility of leaking the oil out of the hydraulic chamber and of permitting outside air to enter the hydraulic chamber, thus quickly deteriorating functions of the hydraulic damper.

Accordingly, the present invention aims at providing a structure vibration control device configured such that a volume of a hydraulic chamber of a hydraulic damper can be varied and damping force characteristics thereof varies corresponding to magnitude of an earthquake, thus making it possible to maintain its function over a period of time.

SUMMARY OF THE INVENTION

According to the present invention, a structure vibration control device includes a hydraulic damper installed aslant between one and other structural members of a structure.

The hydraulic damper includes a cylinder, a hydraulic chamber provided in the cylinder and filled with oil, a piston partitioning the hydraulic chamber into two oil chambers between which the oil communicates with a predetermined damping force characteristic, and a piston rod connected with the piston, an end of the piston rod being connected to the one structural member and an end of the cylinder being connected to the other structural member, an end member formed within the cylinder immovably at least in an axial direction, a float member formed within the cylinder movably in the axial direction and forming the hydraulic chamber between the end member and the float member, a preload chamber formed between a closing portion closing the end of the cylinder and the float member and having a bias force counteracting to a hydraulic pressure acting from the hydraulic chamber to the float member, a first piston valve provided on one side of the piston and restricting a flow of the oil from the one oil chamber to the other oil chamber, and a second piston valve provided on another side of the piston and restricting a flow of the oil from the other oil chamber to the one oil chamber.

The first piston valve exhibits such damping force characteristics to a flow of the oil from the other oil chamber to the one oil chamber, i.e., a flow of the oil in a direction opposite to the flow of the oil restricted by the first piston valve, that the first piston valve is located at a closed position and thereby limits the flow of the oil in the opposite direction and the hydraulic damper functions approximately as a rigid body having a great damping characteristics such that a variation of a load applied to the piston with respect to a moving speed of the piston rises with a steep gradient in a state in which the moving speed of the piston with respect to the cylinder is a predetermined value or less, and that the first piston valve is opened and thereby permits the oil to flow and the hydraulic damper is put into a damping state with a small damping characteristics in which the variation of the load with respect to the moving speed is small, i.e., moderate, in a state in which the moving speed of the piston is faster than the predetermined value.

The second piston valve exhibits such damping force characteristics to a flow of the oil from the one oil chamber to the other oil chamber, i.e., in a direction opposite to the flow of the oil restricted by the second piston valve, that it is located at a closed position and thereby limits the oil flowing in the opposite direction by leakage or through an orifice and the hydraulic damper functions approximately as the rigid body having the great damping characteristics such that the variation of the load applied to the piston with respect to the moving speed of the piston rises with a steep gradient in the state in which the moving speed of the piston with respect to the cylinder is the predetermined value or less, and that the second piston valve is opened and thereby permits the oil to flow in the opposite direction and the hydraulic damper is put into the damping state with the small damping characteristics in which the variation of the load with respect to the moving speed is small, i.e., moderate, in the state in which the moving speed of the piston is faster than the predetermined value.

Further features of the present invention will become apparent from the following description of exemplary embodiments (with reference to the attached drawings).

BRIEF DESCRIPTION OF THE DRAWINGS

FIG. 4A is a sectional enlarged view showing a piston part of a piston valve taken along a line a-a in FIG. 4B.

FIG. 4B is a side enlarged view of the piston part of the piston valve.

DESCRIPTION OF THE EMBODIMENT

Figure 1:
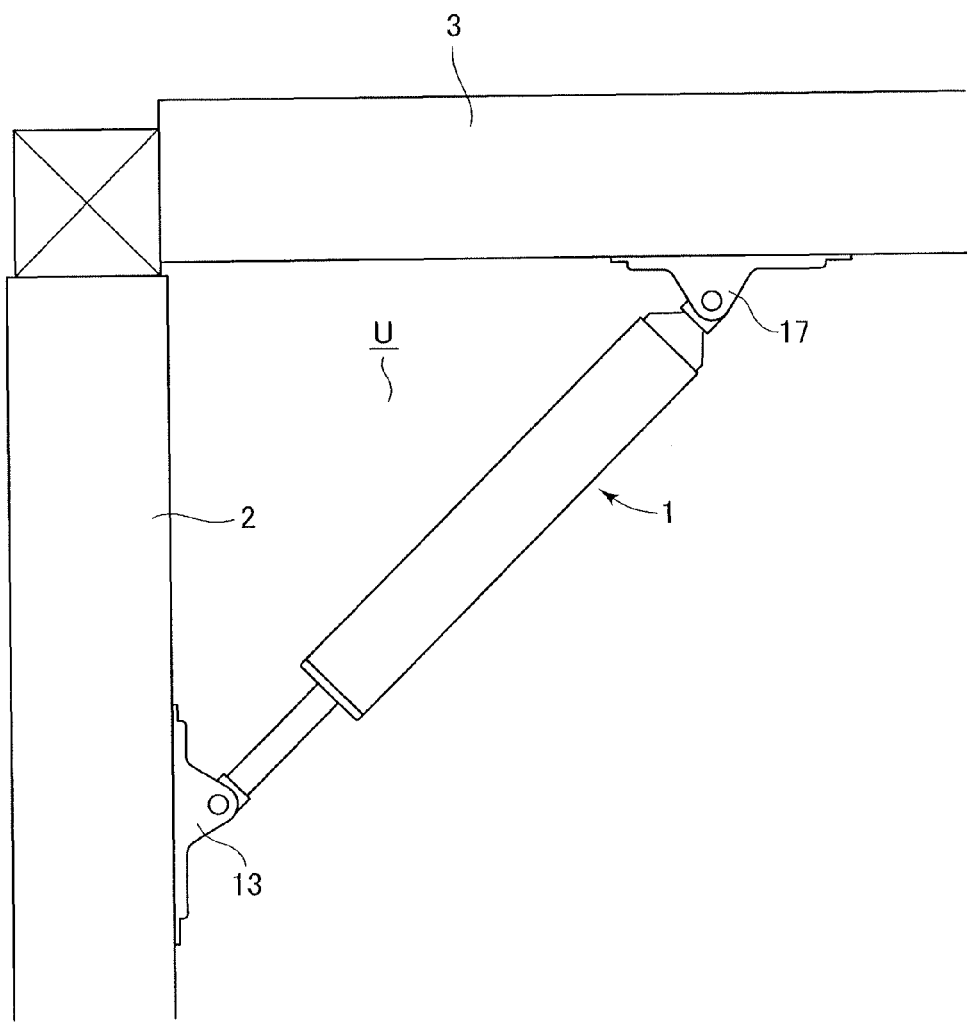
FIG. 1 is a front view showing an embodiment in which a vibration control device of the present invention is applied to a building.

An embodiment of the present invention will be explained with reference to the drawings. As shown in FIG. 1, a vibration control device U of the invention includes a hydraulic damper 1 and is used by being installed aslant between a pillar 2 and a beam 3 of a structure. While the vibration control device U of the invention is suitably used for a wooden house constructed by a framework method, a two-by-four method and others, the vibration control device U is applicable not only to those described above but also to all kinds of structures such as a building having a lightweight and heavyweight steel skeleton structures, a tower, a bridge and others. The vibration control device U is also applicable not only to a newly-built structure but also to seismic strengthening of an existing structure. The vibration control device U may be configured such that the hydraulic damper 1 is not only connected directly between structural members but also interposed between parts of a brace structure.

Figure 2:
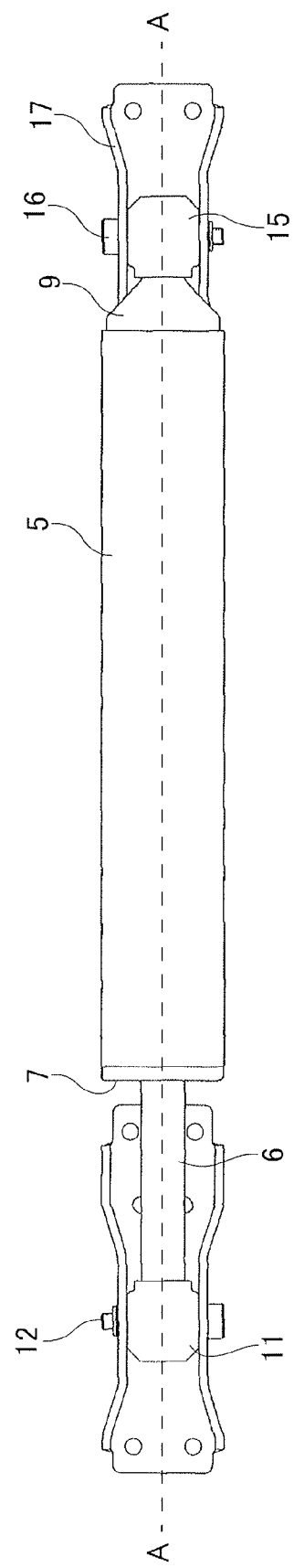
FIG. 2 is a front view showing a hydraulic damper of the vibration control device.
Figure 3:
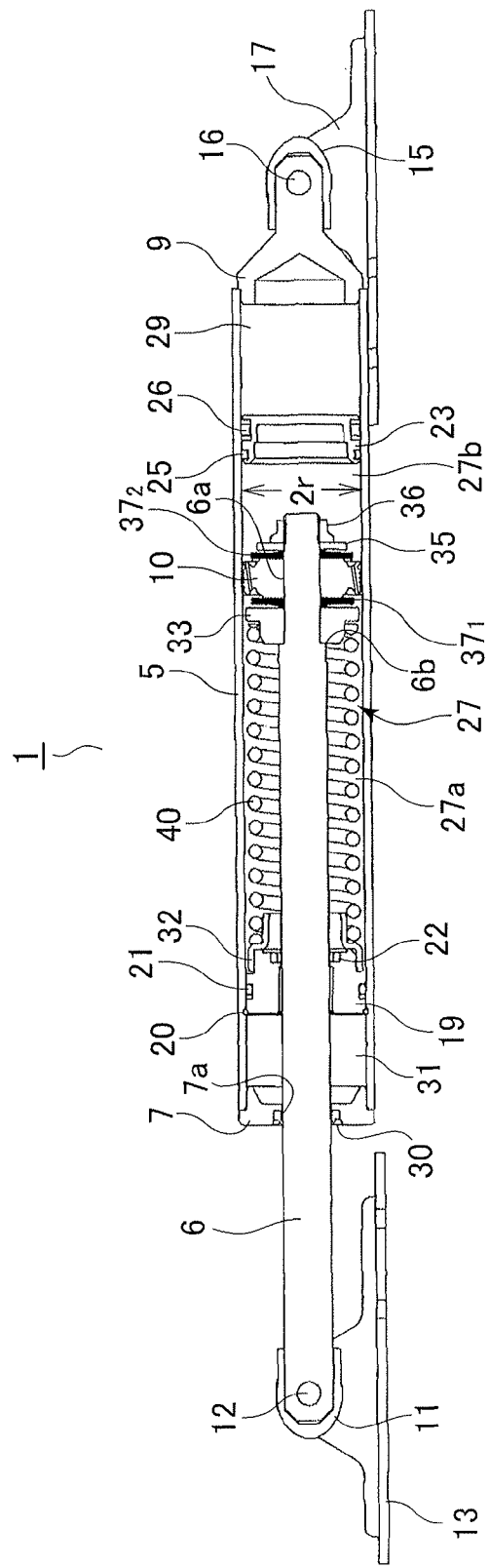
FIG. 3 is a section view of the hydraulic damper taken along a line A-A in FIG. 2.

As shown in FIGS. 2 and 3, the hydraulic damper 1 includes a cylinder 5 and a piston rod 6. One end of the cylinder 5 is closed by a cap member 7 and another end thereof is closed by a link member 9. One end of the piston rod 6 is a small diameter portion 6a fitted into a piston 10. A boss portion 11 is immovably fixed to the other end of the piston rod 6. The boss portion 11 is connected turnably to a fitting 13 through an intermediary of a bolt 12. Another boss portion 15 is immovably fixed to the link member 9 of the other end of the cylinder 5. Another fitting 17 is turnably linked to the boss portion 15 through an intermediary of a bolt 16.

An annular end member 19 is fitted into one side of the cylinder 5 and an axial position thereof is set immovably with respect to the cylinder 5 by a snap ring 20. An O-ring 21 is attached around an outer circumferential surface of the end member 19 and an O-ring 22 is attached to an inner circumferential surface thereof where the piston rod 6 penetrates through. The end member 19 oil-tightly partitions a space within the cylinder 5 into spaces before and after the end member 19 in the axial direction thereof. A float member 23 is fitted in the other side of the cylinder 5 movably in the axial direction and a slide ring 25 and a seal ring are attached around an outer circumferential surface of the float member 23 by side by side in the axial direction. The float member 23 oil-tightly and air-tightly partitions a space into spaces before and after the float member 23 in the axial direction.

Oil having predetermined viscosity is filled into the space between the end member 19 and the float member 23 within the cylinder 5 and forms a hydraulic chamber 27. It is noted that while the oil here means a liquid having the predetermined viscosity and is oil in general, it is not limited to oil in a narrow sense. An inert gas such nitrogen gas of predetermined pressure is filled into the space between the float member 23 and the link member 9 within the cylinder 5 and forms a gas chamber (preload chamber) 29. The cap member 7 at one end of the cylinder 5 has a guide hole 7a through which the piston rod 6 is slidably inserted and supported. The guide hole 7a is provided with a scraper 30 attached so as to be in contact slidably with the piston rod 6 and to scrape dusts and others attached to the piston rod 6. The space between the end member 19 and the cap member 7 within the cylinder 5 is an air chamber (spare void) 31 to which air freely goes in and out. A distance in the axial direction of the air chamber 31 is longer than a stroke of the hydraulic damper 1.

A spring receiving fitting 32 is disposed adjacent the hydraulic chamber 27 side of the end member 19, and a spring receiving ring member 33 is disposed fittingly to the small diameter portion 6a of the piston rod 6. A nut 36 is screwed into a tip part of the small diameter portion 6a of the piston rod 6 through an intermediary of a washer 35. The spring receiving ring member 33, the piston 10 and both first and second piston valves $37_1$ and $37_2$ are positioned with respect to the piston rod 6 by the nut 36 so as to sandwich the piston 10 through the intermediary of the first and second piston valves $37_1$ and $37_2$ located on both sides of the piston 10 by abutting the spring receiving ring member 33 to a piston rod stepped portion 6b. The hydraulic chamber 27 is partitioned into a rod-side oil chamber 27a and a non-rod-side oil chamber 27b by the piston 10. A spring 40 is provided contractively between the spring receiving fitting 32 and the spring receiving ring member 33 within the rod-side oil chamber 27a.

As shown in FIGS. 4A and 4B in detail, the piston 10 has convex projections 45 formed on both side surfaces 10a and 10b annularly centering on the piston rod 6 and annular hydraulic spaces 46l and 46r formed between the projections 45 and a boss portion 44 of the piston 10 into which the small diameter portion 6a of the piston rod 6 is fittingly inserted. It is noted that the projections 45 and the boss portion 44 are formed such that their projecting heights with respect to the both piston side surfaces 10a and 10b are equal, i.e., in flush. The piston 10 includes a plurality (three in the present embodiment) of contraction side oil passages 47 communicating the hydraulic space 46*l* at one side surface 10*a* with an outer diameter side of the annular projection on the other side surface 10*b* and a plurality (three) of extension side oil passages 49 communicating the hydraulic space 46*r* on the other side surface 10*b* with an outer diameter side of the annular projection 45 on the one side surface 10*a*. The both oil passages 47 and 49 consist a same number of oil passages and have a same shape, i.e., rectangular in section, lengthy in a circumferential direction. It is noted that the shape and the number of the oil passages 47 and 49 may be differentiated on the extension side from those of the contract side.

Figure 8:
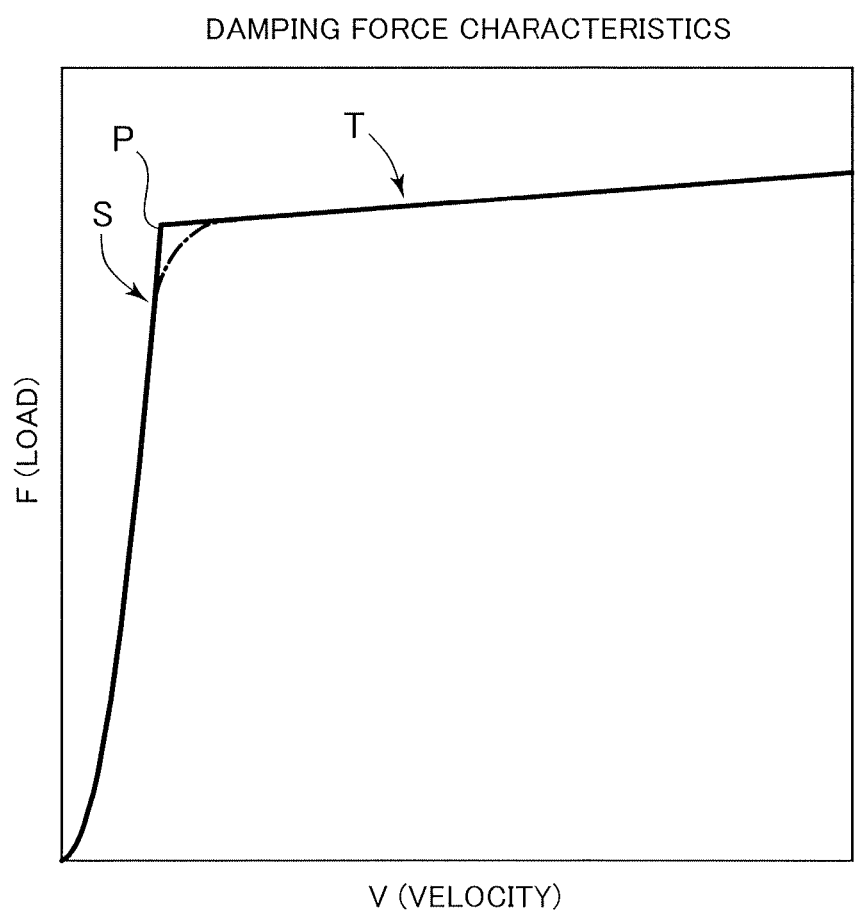
FIG. 8 is a graph showing damping force characteristics of the hydraulic damper.

Each of the first and second piston valves $37_1$ and $37_2$ is composed of a valve seat plate 50 made of an annular plate spring whose outer peripheral part abuts against the annular projection 45, and a disc spring 51 pressing the valve seat plate 50 to the annular projection 45 with a predetermined bias force. The first piston valves $37_1$ located on the left side of the piston 10 in FIG. 3 functions as a check valve restricting the move of the oil passing through the oil passage 47 of the both oil chambers 27*a* and 27*b* in response to the move of the hydraulic damper 1 in the expansion direction and controlling the flow of the oil passing through the oil passage 47 between the both oil chambers 27*a* and 27*b* to a predetermined characteristics in response to another move of the hydraulic damper 1 in the contraction direction. The second piston valve $37_2$ located on the right side of the piston 10 in FIG. 3 functions as a check valve restricting the move of the oil passing through the oil passage 49 between the both oil chambers 27*a* and 27*b* in response to the move of the hydraulic damper 1 in the contraction direction and controlling the oil passing through the oil passage 49 between the both oil chambers 27*a* and 27*b* to a predetermined characteristics in response to the move of the hydraulic damper 1 in the expansion direction. That is, as shown in FIG. 8, the first and second piston valves $37_1$ and $37_2$ have such damping force characteristics to the flows of the oil in the directions opposite to the restricted flows that a variation of a load F moving the piston 10 with respect to a variation of the moving speed of the piston 10 is large (part S) in a case when the moving speed V of the piston 10 is less than a predetermined value P and that the variation of the load F moving the piston 10 with respect to the variation of the moving speed of the piston 10 is small (part T) in a case when the moving speed V of the piston 10 is larger than the predetermined value P. It is noted that while the predetermined value P described above is indicated substantially by a dot in FIG. 8 and it is preferable that the value is switched from the steep gradient (part S) to the moderate gradient (part T) in a narrow area such as the point, the value may be switched smoothly within a certain range as indicated by a chain dot line in FIG. 8. A concept of the predetermined value (inflexion point) includes such a line. In the present embodiment, the first and second piston valves $37_1$ and $37_2$ include respectively two of the valve seat plates 50 and three of the disc springs 51, the number and a radial size, and thickness of those plates are set appropriately in accordance to the characteristics described above. A pressure ring 53 having predetermined sealing characteristics and being slidingly in contact with an inner circumferential surface of the cylinder 5 is attached around an outer circumferential surface of the piston 10.

Because the present embodiment is constructed as described above, the hydraulic damper 1 is installed aslant between the pillar 2 and the beam 3 of a structure by attaching the fittings 13 and 17 respectively to the pillar 2 and the beam 3 by screws or the like. If a change in ambient temperature affects the temperature of the oil within the hydraulic chamber 27, the oil expands or contracts. Then, the float member 23 supported slidably within the cylinder 5 and constituting a free piston moves while resisting against or corresponding to a bias force of a high-pressure gas charged within the gas chamber 29 corresponding to a volume change of the hydraulic chamber 27 caused by the expansion or contraction of the oil. This arrangement makes it possible to prevent the oil from leaking out and air from being taken in the from O-rings 21 and 22 of the end member 19 and the slide ring 25 and the seal ring 26 of the float member 23 without exerting excessive pressure to them even if the volume of the oil in the hydraulic chamber is changed due to the change of the ambient temperature because the float member 23 moves and absorbs the volume change by elastic compression of the high pressure gas.

The piston rod 6 is configured to extend within the rod-side oil chamber 27*a* of the hydraulic chamber 27 so as to project out of the cylinder 5 and not to extend in the non-rod-side oil chamber 27*b*, so that a difference of hydraulic pressures equivalent to a sectional area of the piston rod 6 is generated between the both ends of the piston 10. Therefore, due to the difference of the areas of the both oil chambers 27*a* and 27*b*, while a force biasing and moving the piston 10 in a direction of the piston rod 6 side acts on the piston 10, the bias force of the spring 40 disposed in the rod-side oil chamber 27*a* acts on the piston 10 in the present embodiment, and the piston 10 is held at an intermediate position between a totally compressed position of the spring 40 and the float member 23, i.e., a position where the bias force of the spring 40 is balanced with the bias force caused by the difference of areas.

While the hydraulic pressure within the hydraulic chamber 27 based on the bias force of the spring 40 acts on the float member 23, the high-pressure gas is charged in the gas chamber 29 and the float member 23 is held at a predetermined position where the hydraulic pressure of the hydraulic chamber 27 is balanced with the gas pressure of the gas chamber 29.

Thereby, the hydraulic damper 1 has a predetermined length set in advance in a natural state in which no outside force is applied, and the hydraulic damper 1 having the predetermined length is mounted between the pillar 2 and the beam 3 as described above. In this state, the piston 10 is positioned substantially at a center of a strokable range in the hydraulic chamber 27.

In a case when the building is shaken by an earthquake, the hydraulic damper 1 expands/contracts and the piston 10 positioned substantially at the center of the stroke range receives a force of moving in the horizontal direction shown in FIGS. 2 and 3. In a case when the piston 10 tries to move in the right direction (contraction direction) within the hydraulic chamber 27, the oil of the non-rod-side oil chamber 27*b* contracts, flows into the left hydraulic space 46*l* through the contraction side oil passage 47, and causes a force in a direction of flowing into the rod-side oil chamber 27*a* by deflecting the valve seat plate 50 of the first piston valve $37_1$. In a case when the piston 10 tries to move in the left direction (expansion direction) in the hydraulic chamber 27 in contrary, the oil in the rod-side oil chamber 27*a* flows into the right hydraulic space 46*r* through the expansion side oil passage 49 and causes a force in a direction of flowing into the non-rod-side oil chamber 27*b* by deflecting the valve seat plate 50 of the second piston valve $37_2$. At this time, in the case when the piston 10 moves in the contraction side, the valve seat plate of the second piston valve $37_2$ abuts against the annular projection 45 and blocks the flow of the oil from the non-rod-side oil chamber 27b through the right hydraulic space 46r and the expansion side oil passage 49. In the case when the piston 10 moves in the expansion side, the valve seat plate 50 of the first piston valve $37_1$ abuts against the annular projection 45 and blocks the flow of the oil from the rod-side oil chamber 27a to the non-rod-side oil chamber 27b through the left hydraulic space 46l and the contraction side oil passage 47.

In a case when the earthquake is weak and the building is shaken less, the force in the expansion/contraction directions acting on the hydraulic damper 1 is also small and weak. In this case, the force moving the piston 10 within the hydraulic chamber 27 is weak and its moving speed is also slow. In the case when the hydraulic damper 1 contracts, i.e., when the piston 10 moves toward the non-rod-side oil chamber 27b, even though the oil within the non-rod-side oil chamber 27b tries to flow into the left hydraulic space 46l through the contraction side oil passage 47, an increase of the hydraulic pressure acting on the left hydraulic space 46l is small because the force moving the piston 10 is weak and slow. Therefore, the first piston valve $37_1$ is held in a closed position in which the valve seat plate 50 is substantially in contact with the annular projection 45 by the bias force of the disc spring 51. In the same manner, in the case when the hydraulic damper 1 expands, i.e., when the piston 10 moves toward the rod-side oil chamber 27a, even though the oil within the rod-side oil chamber 27a tries to flow into the right hydraulic space 46r through the expansion side oil passage 49, the hydraulic pressure of the right hydraulic space 46r is also small and the second piston valve $37_2$ is held in a closed position in which the valve seat plate 50 is substantially in contact with the annular projection 45.

Accordingly, when a magnitude of the earthquake is relatively small and energy acting on the building is small, the hydraulic damper 1 is kept in a state in which a damping force characteristics is great, i.e., the oil trying to flow to the non-rod-side oil chamber 27b and the rod-side oil chamber 27a in the both contraction and expansion directions is restricted and the hydraulic damper 1 receive a great resistance force in the contracting/expanding movements thereof. That is, in the case when the moving speed of the piston 10 is slow, the oil circulating through the both oil chambers 27a and 27b is what leaks out of a gap and others between the valve seat plate 50 and the annular projection 45 and its amount is very little. Then, a great load (resistance force) acts and the hydraulic damper 1 functions approximately as a rigid body by which a gradient (variation) of the load F with respect to the piston velocity V increases as indicated by a part S in FIG. 8. Thereby, in the case when the vibration energy is small and the building shakes relatively less in such cases when the magnitude of the earthquake is small or the building is shaken by vibration caused by vehicles passing through a road, the vibration control device U including the hydraulic damper 1 functions as an angle brace close to the rigid body to the building, suppresses the building from shaking, and improves strength of the building. At this time, even if intensive loads act on the fittings 13 and 17 of the hydraulic damper 1 fixed to the pillar 2 and the beam 3, the fittings will not be broken because the vibration energy is relatively small. Still further, because the oil flowing between the both oil chambers 27a and 27b flows through the narrow passages between the valve seat plate 50 and the annular projection 45 while receiving the great resistance, the oil absorbs the building vibrating energy effectively by converting the energy into heat and as hysteresis. Thus, the inventive hydraulic damper whose damping force characteristics is high can suppress the building from being otherwise shaken by small vibration energy, and can improve a quality of the structure such as livability of the building.

Figure 5:
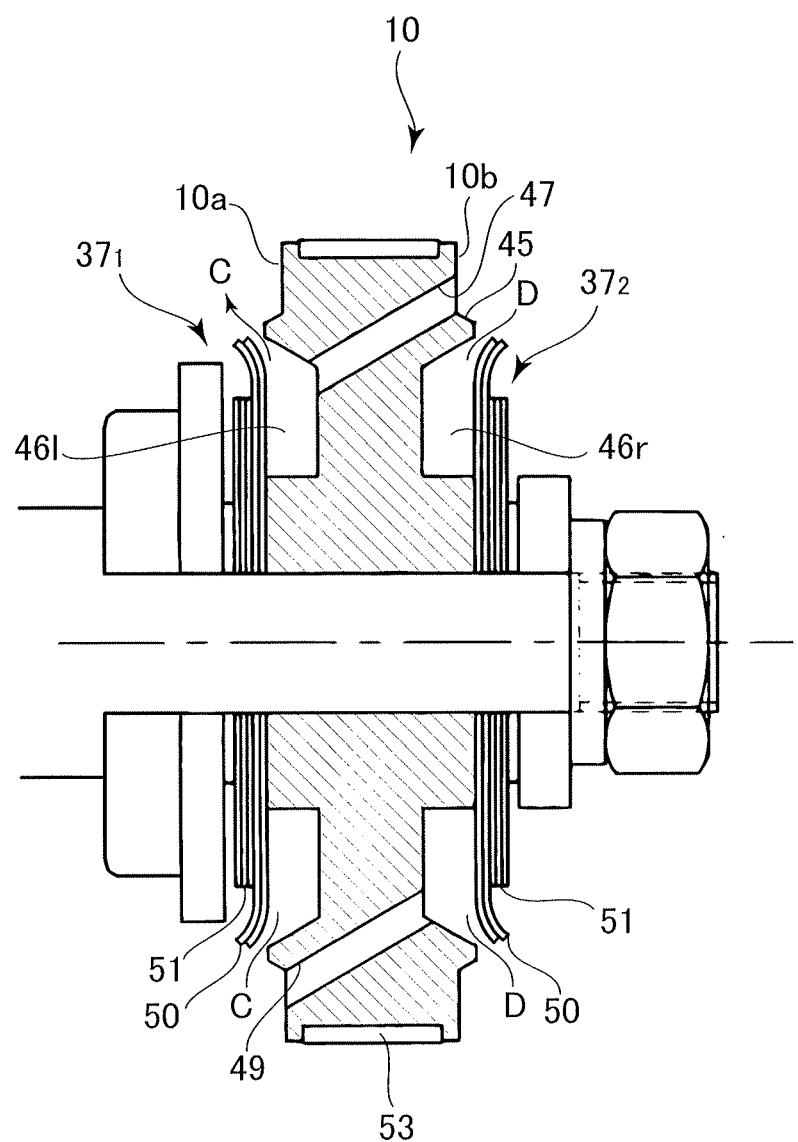
FIG. 5 is a section view of the piston part showing a state in which valve seat plates of the piston valve are deflected.

In a case when a magnitude of the earthquake is great and the building shakes more, the force in the expansion/contraction directions acting on the hydraulic damper 1 increases, the stroke of the hydraulic damper 1 increases and the moving speed of the piston 10 increases. In this state, the piston 10 quickly moves with a large stroke. In a case when the piston 10 moves in the right (contraction) direction, hydraulic pressure of the oil flowing from the non-rod-side oil chamber 27b to the left hydraulic space 46l through the contraction side oil passage 47 increases and the valve seat plate 50 of the first piston valve $37_1$ deflects in a direction in which an outer peripheral part thereof separates from the annular projection 45 while resisting against the spring force of the valve seat plate 50 itself and the bias force of the disc spring 51, i.e., a backup spring, as shown in FIG. 5. In the same manner, in a case when the piston 10 moves in the left (expansion) direction, hydraulic pressure of the oil flowing from the rod-side oil chamber 27a to the right hydraulic space 46r through the expansion side oil passage 49 increases and the valve seat plate 50 of the second piston valve $37_2$ deflects in a direction in which an outer peripheral part thereof separates from the annular projection 45.

Thereby, the first and second piston valves $37_1$ and $37_2$ make passages C and D respectively between the valve seat plate 50 and the annular projection 45 as shown in FIG. 5. Then, because the oil flows to the both oil chambers 27a and 27b through the passages C and D, the hydraulic damper 1 is put into a state in which the damping force characteristics is low, i.e., the gradient (variation) of the load F with respect to the piston velocity V is low, as indicated by a part T in FIG. 8, and the hydraulic damper 1 expands/contracts with a low resistance force. Therefore, in the case when the earthquake is great, the hydraulic damper 1 damps the vibration of the building by the relatively low damping force characteristics and absorbs the energy of the earthquake. At this time, as shown in FIG. 5 and as described above, the entire outer peripheral part of the valve seat plate 50 separates from the annular projection 45 and the passages C and D each having a relatively large area is formed at once between the valve seat plate 50 and the annular projection 45 having a long peripheral length. Thereby, as shown in FIG. 8, the damping force characteristics of the hydraulic damper is switched instantly from the steep gradient (S) to the moderate gradient (T) at a predetermined value (inflection point) P.

Because the hydraulic damper 1 damps the vibration while expanding/contracting itself in this state, no large intensive load acts around the fittings 13 and 17 and such a possibility that the fitting parts or the pillar 2 and the beam 3 is destroyed is reduced. The seismic energy is converted into heat and absorbed by the relatively large amount of oil flowing while being squeezed by the passages C and D. Still further, even if the building is deformed to a plastic deformation zone by the earthquake, the hydraulic damper 1 is biased to return to the initial position of the both oil chambers 27a and 27b by the difference of the areas of the piston rod 6 as the spring 40 is balanced with the gas pressure of the gas chamber 29 after when the earthquake ends, and the building deformed to the plastic deformation is also returned to the original state (initial position) by being biased by the hydraulic damper 1 returned to the stroke center position. Thereby, even if a great earthquake hits, though it is rare, the vibration control device U effectively damps the vibration of the building, prevents the building from being destroyed, and improves earthquake resistance of the building.

The hydraulic damper 1 is provided with the air chamber (marginal void) 31 on the side where the piston rod 6 projects out of the cylinder 5 as described above. The piston rod 6 in the air chamber 31 part is kept in a clean condition in which dusts, rust, water and other are removed by the scraper 30 of the cap member 7. Therefore, even if the hydraulic damper 1 expands/contracts due to the earthquake and the piston rod 6 slides in contact with the through hole of the end member 19, the sliding contact part is clean as described above, making it possible to prevent the dusts and others otherwise adhering to the piston rod 6 from damaging the seal (O ring) 22 of the end member 19 and the dusts, water and others from entering the hydraulic chamber 27.

In the case when the first and second piston valves $37_1$ and $37_2$, i.e., the check valves, are located at the closed position, the load F increases in the steep gradient (S) part caused by the oil leakage of the piston 10 and the first and second piston valves $37_1$ and $37_2$, and the hydraulic damper 1 has the high damping force characteristics as shown in FIG. 8. The damping force characteristics of the steep gradient (S) part is 500 to 800 kN/(m/sec). The damping force characteristics becomes close to that of a rigid body, and it is preferable because an initial rigidity by which a large damping force counteracting to abrupt vibrations is obtained.

The damping force characteristics caused by the oil leakage is affected by mechanical precisions such as precision of adhesion between the valve seat plate 50 and the annular projection 45 and fitting precision between the piston 10 and the cylinder 5, so that it is difficult to stabilize the damping force characteristics in high precision. Still further, the expansion/contraction of the hydraulic damper 1 caused by the vibrations of the building due to the earthquake and others are switched to the contraction/expansion sides with a relatively quick period. The damping force increases substantially linearly (in the steep gradient S part) in proportion to a shaking speed to the predetermined value (inflection point) P, and the damping force is held at the substantially constant damping force (moderate gradient T part) after reaching to a relief pressure (P). While the hydraulic damper 1 stops to operate instantly at the moment when the expansion and contraction are switched, residual pressure is generated in the oil chambers 27a and 27b if the oil leakage is set to be minimum. As a result, even if the hydraulic damper 1 starts to operate in the opposite direction, no force resisting against a force in the operating direction of the piston 10 is generated and the damping force is generated with a delay until when the residual pressure is eliminated. The delay of the rise of the damping force affects a hysteresis area and an energy absorption amount is reduced.

Then, as a result of ardent study, the inventor has found that a desirable result can be obtained when the variation (gradient) of the load with respect to the moving speed in the case when the piston valves are located at the closed position (steep gradient part S) is in a range of 150 to 600 kN/(m/sec). That is, if the gradient is 150 kN/(m/sec) or less, it is unable to effectively suppress the building from being shaken by absorbing the vibrational energy of the building caused by the small earthquake and the like and if the gradient is 600 kN/(m/sec) or more, the residual pressure is generated and the vibrational energy cannot be effectively absorbed.

Modified Embodiment

Figure 6:
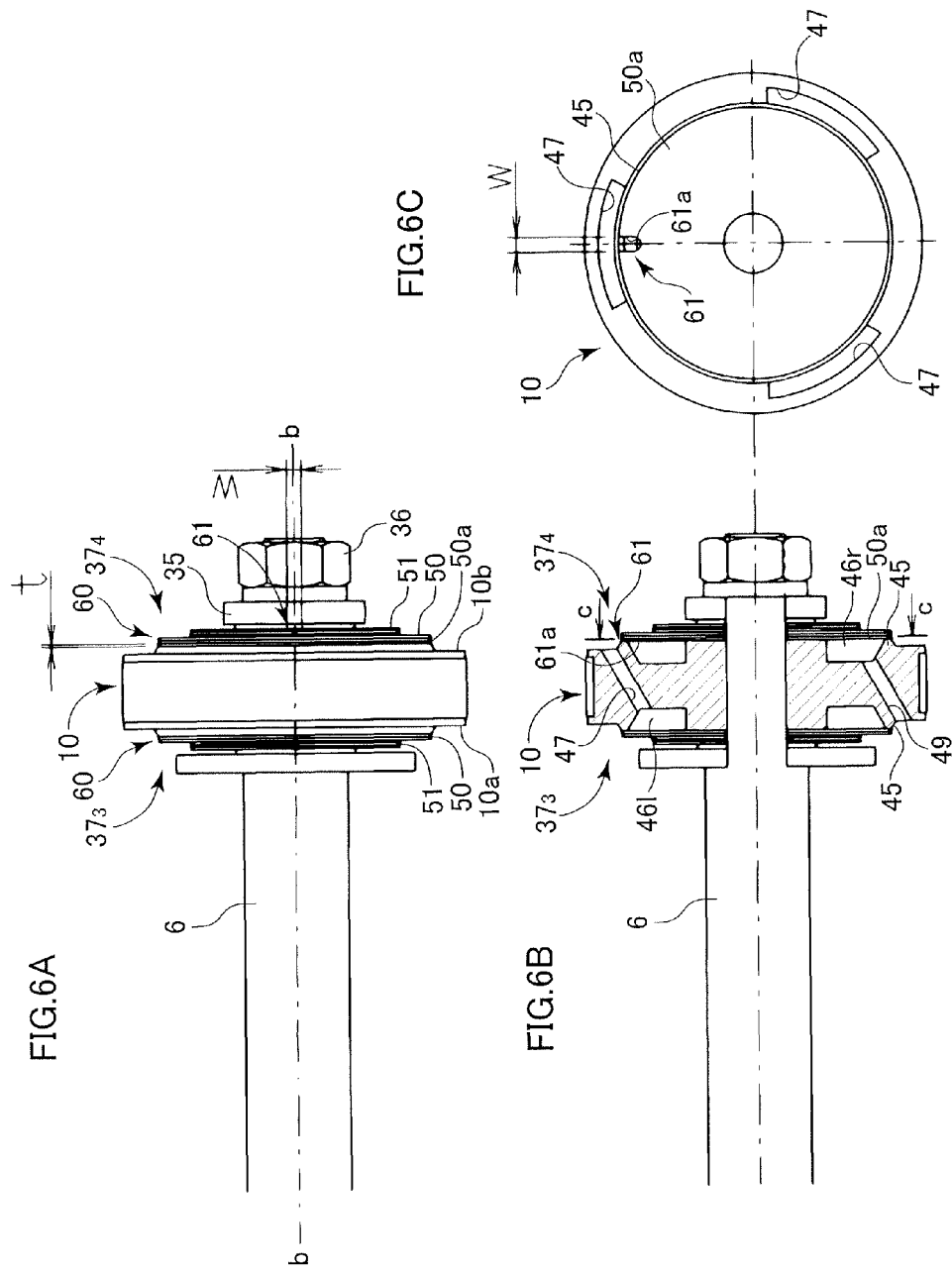
FIG. 6A is a front view showing an embodiment including a piston valve partly modified.
FIG. 6B is a longitudinal section view taken along a line b-b in FIG. 4B and showing the other embodiment including a piston valve still partly modified.
FIG. 6C is a section view taken along a line c-c in FIG. 4B and showing the embodiment including the piston valve partly modified.

A partly modified embodiment will be described with reference to FIGS. 6A through 6C. It is noted that while the modified embodiment is different in that an orifice is added to the first and second piston valves beside the check valve function, the other components are the same with those described in the previous embodiment, so that the modified embodiment will be described by denoting by the same reference numerals and their explanation will be omitted here.

Each of the first and second piston valves $37_3$ and $37_4$ of the present embodiment has a check valve 60 composed of the plurality of valve seat plates 50, the disc spring 51 and the annular projection 45. Either one of the first and second piston valves $37_3$ and $37_4$, e.g., the second piston valve $37_4$, is provided with the orifice (by-pass) 61 formed of one groove 61a extending from an outer diameter side of one sheet (50a) of the valve seat plates 50 to a position in contact with the hydraulic space 46 of the valve seat plate 50a in contact with the projection 45 among the plurality of valve seat plates 50. The orifice (by-pass) 61 has a flow area a (=t×W) formed of a thickness t, e.g., 0.15 mm, of the valve seat plate 50 by a width W, e.g., 0.5 mm, of the groove 61a, and communicates the one oil chamber 27a with the other oil chamber 27b through the hydraulic space 46 and the oil passage 49. An opening area ratio z (=a/A) which is a ratio of the flow area a with respect to an inside diameter cross section area A (=$\pi r^2 \approx$ area of piston), where r denotes an inner radius of the cylinder 5, is set within a range of 0.004 to 0.040. The opening area ratio z of the orifice 61 is a considerably small value as compared to that of an orifice of a hydraulic damper of a vehicular damper because the orifice of the present embodiment is of a very small flow area formed with the groove 61a having a small width formed only through one (the piston valve $37_4$) of the first and second piston valves $37_3$ and $37_4$ and only at one place of the entire circumference of the valve seat plate. The orifice 61 formed of such a very small flow area makes it possible for the hydraulic damper 1 to stably obtain the damping force characteristics of 150 to 600 kN/(m/sec) having the steep gradient S part as described above.

It is noted that the orifice 61 composed of the groove 61a may be formed of a plurality of grooves by forming not only in one valve seat plate 50a but also in the valve seat plate 50 of the first piston valve $37_3$ for example. Still further, while it is preferable to form the orifice to the valve seat plate as described above because the very small flow area can be obtained with a high degree of freedom, it is possible to adopt another configuration as long as the orifice communicates two oil chambers.

For instance, in the first and second piston valves $37_1$ and $37_2$ in which no groove 61a is formed and no orifice is formed through the valve seat plate 50, the damping force characteristics (equivalent rigidity) in the steep gradient S is 600 to 800 kN/(m/sec) in a case where the adhesion precision of the check valves and the fitting precision of the piston are relatively high. While the equivalent rigidity is great in the range of the damping force characteristics and a great damping effect is brought about in a large deforming area, acceleration (impact) absorbability is small and a damping constant tends to be small in a very small deforming area. It is noted that one having no orifice is capable of obtain the damping force characteristics of 600 kN/(m/sec) or less, i.e., the damping force characteristics of 150 to 800 kN/(m/sec), depending on the adhesion precision of the check valves and the fitting precision of the piston.

For instance, in a case when the groove 61a is formed to one valve seat plate 50a of the first and second piston valves $37_3$ and $37_4$, respectively, and the orifice 61 is composed of the two grooves, a flow area a becomes 0.15 mm². The damping force characteristics (equivalent rigidity) in the steep gradient S in this case becomes 350 to 600 kN/(m/sec), and the equivalent rigidity is relatively large, the acceleration (impact) absorbability is also brought about, and one can expect a well-balanced damping effect to a large shaking area from the large deforming area to the very small deforming area in the range of this damping force characteristics.

A flow area a of the orifice 61 formed of the four grooves 61$a$ in total amounts 0.3 mm$^2$ and the damping force characteristics (equivalent rigidity) in the steep gradient S in this case is 150 to 350 kN/(m/sec). In the range of this damping force characteristics, the acceleration (impact) absorbability increases, thus this damping force characteristics effectively functions in the very small deforming area and enables to expect a large damping effect to ordinary vibrations and the like caused by a truck traveling on a road for example.

It is noted that the number of the grooves 61$a$ is not limited to two or four and may be one, three or more and this configuration can be set adequately in the range in which the damping force characteristics is 150 to 800 kN/(m/sec).

Accordingly, the damping force characteristics in the gradient S effectively functions as the structure vibration control device described above within the range of 150 to 800 kN/(m/sec) and is preferable as the structure vibration control device because the vibration control device generates no response lag otherwise caused by the residual pressure in the range of 150 to 600 kN/(m/sec) in the state in which the vibration control device is provided with the orifice. This arrangement also makes it possible to expect the damping effect in a larger range in which the equivalent rigidity is well-balanced with the acceleration (impact) absorbability in the range of 300 to 600 kN/(m/sec).

Next, a modified embodiment in which piston valves 37$_5$ and 37$_6$ are partly modified will be described with reference to FIG. 7. It is noted that the components and parts corresponding to those in the previous embodiments will be denoted by the same or corresponding reference numerals and their explanation will be omitted here. A piston 10' includes a boss portion 44 into which the small diameter portion 6$a$ of the piston rod 6 is fitted and the annular projection 45. Both side surfaces 10'$a$ and 10'$b$ are configured such that each projecting height H of the annular projection 45' is higher than a projecting height h of the boss portion 44. The first and second piston valves 37$_5$ and 37$_6$ are mounted on the both side surfaces 10'$a$ and 10'$b$ by fastening by a nut 36 between the piston rod stepped portion 6$b$ through an intermediary of a washer 35, a spring receiving ring member 33 and the like. It is noted that the piston valves 37$_5$ and 37$_6$ may not have the orifice or may have the orifice as shown in FIG. 6A through 6C.

The valve seat plate 50 and the disc spring 51 are pressed to the piston valves by the fastening nut 36 such that the center parts thereof are in contact with the boss portion 44 and the outer circumferential part of the valve seat plate 50 abuts against the projection 45'. Due to a difference of the projecting heights of the projection 45' and the boss portion 44 (H>h), the valve seat plate 50 composed of the sheet spring deflects and a predetermined preload is applied in a direction in which the outer circumferential part thereof is in contact with the projection 45'.

Thereby, the valve seat plate 50 is held at the closed position by the predetermined preload if the moving speed of the piston 10' is less than the predetermined value and no predetermined hydraulic pressure acts on the hydraulic pressure spaces 46 $r$ and 46$l$. Therefore, the damping force characteristics of the hydraulic damper 1 exhibits such characteristics that the gradient of the steep gradient part (S) becomes steep and the predetermined value P increases. Thereby, the hydraulic damper 1 functions approximately as the rigid body to a weak earthquake and the like and can suppress the building from shaking. In contrary, the damping force characteristics of the hydraulic damper 1 is suddenly switched to the moderate gradient T to a strong earthquake of a predetermined magnitude or more by which the piston moving speed V increases to the predetermined value P or more and the hydraulic damper 1 can control the vibrations of the building and to suppress the building from being destroyed.

Figure 7:
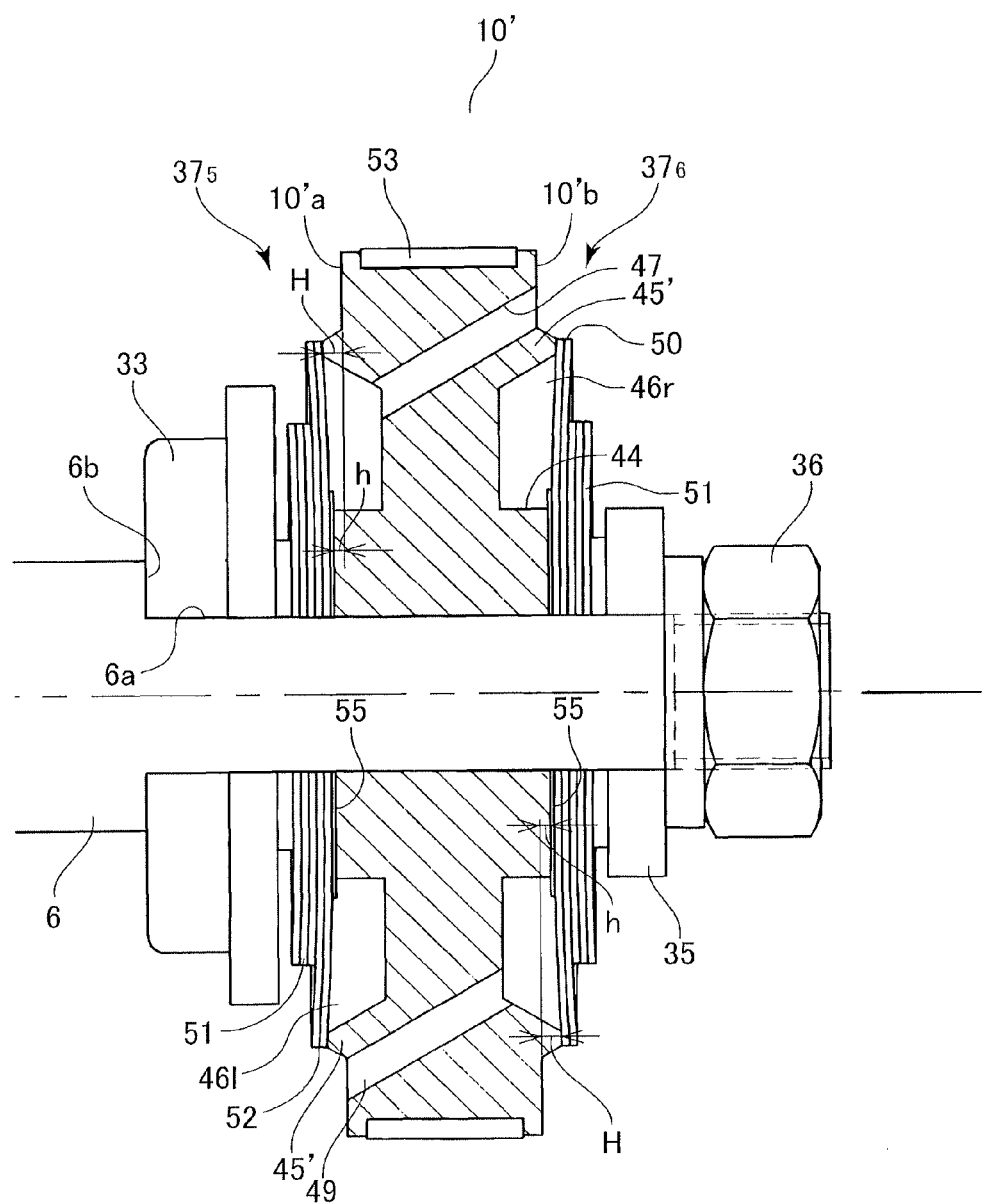
FIG. 7 is a section view showing the piston valve partly modified.

As shown in FIG. 7, the first and second piston valves 37$_5$ and 37$_6$ are mounted by interposing a predetermined number (one in the present embodiment) of spacers 55 between the boss portion 44 and the valve seat plate 50. The predetermined preload acting on the valve seat plate 50 can be adjusted by adjusting the number or a thickness of the spacer 55. This arrangement makes it possible to adjust the preload corresponding to a material of the structuring member (whether it is a wooden frame or a light-weight steel fame), strength of the building, scale, vibration characteristics and others, to select the adequate hydraulic damper 1 corresponding to the building, and to readily apply the hydraulic damper 1.

Figure 9:
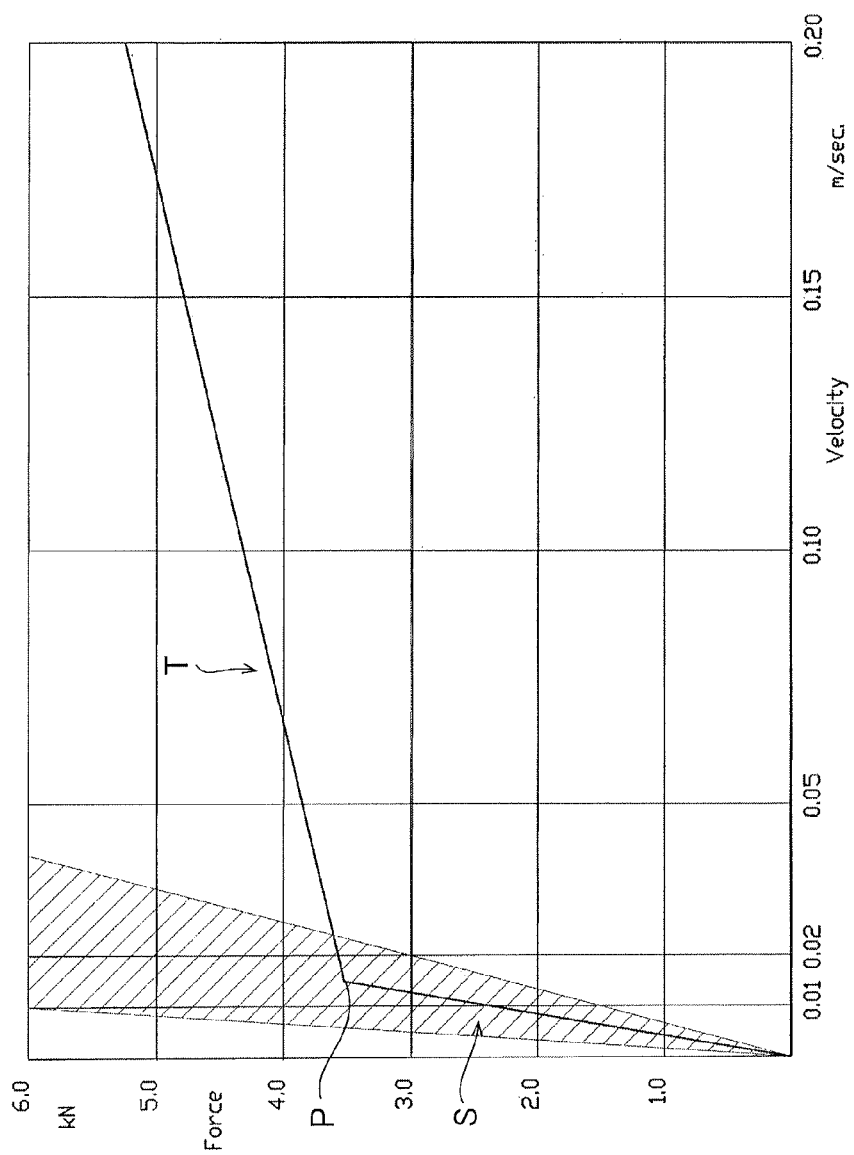
FIG. 9 is another graph showing the damping force characteristics of the hydraulic damper.
Figure 10:
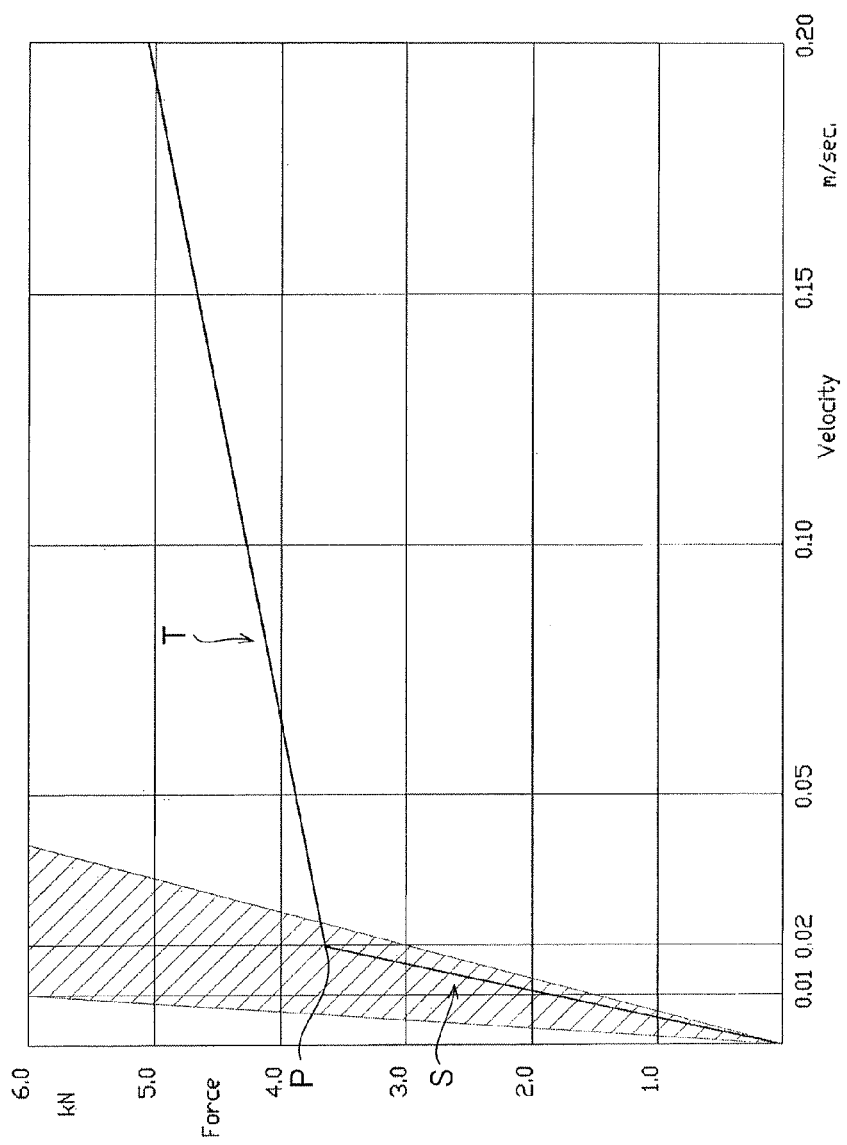
FIG. 10 is a still other graph showing the damping force characteristics of the hydraulic damper.
Figure 11:
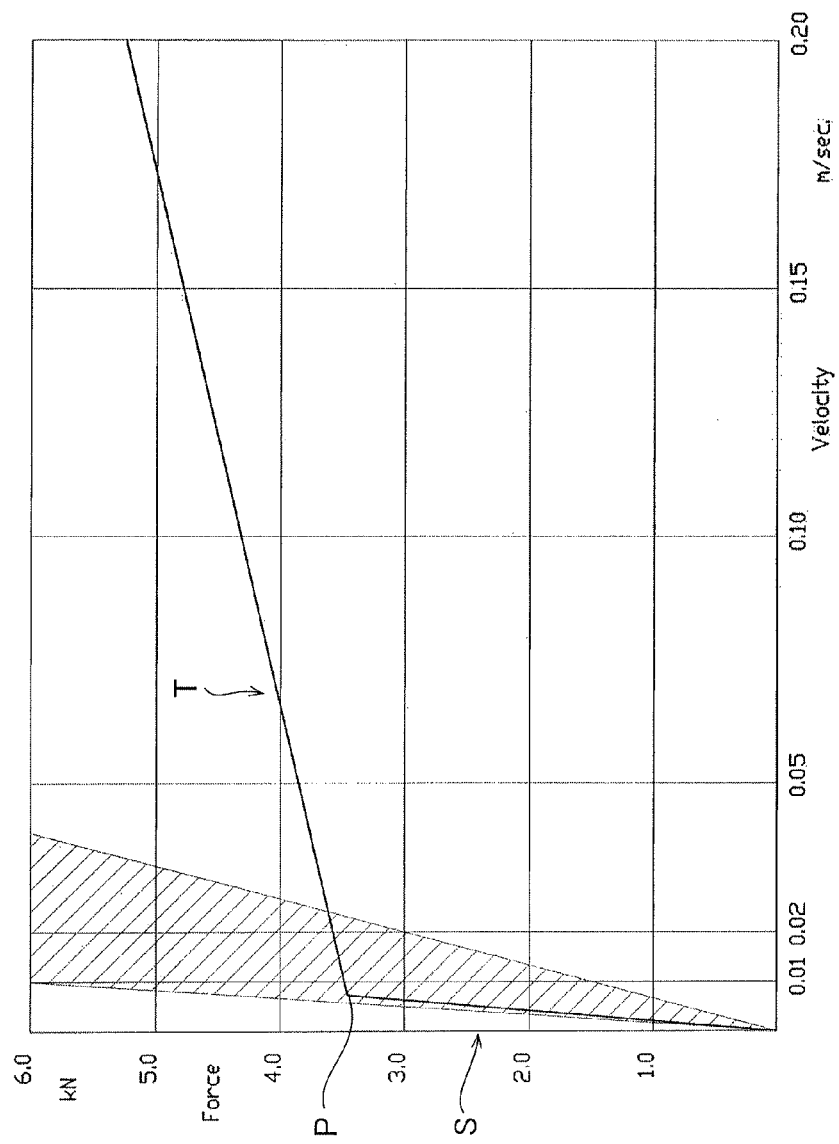
FIG. 11 is a different graph showing the damping force characteristics of the hydraulic damper.
Figure 12:
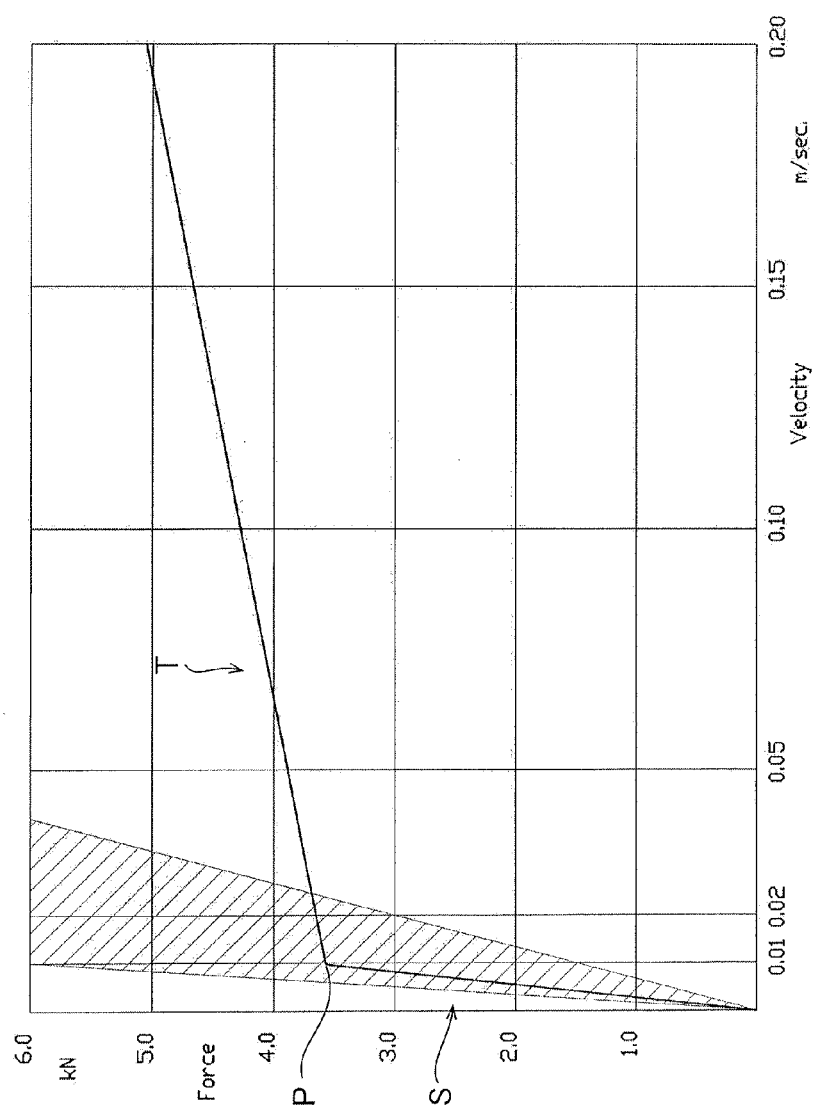
FIG. 12 is a still different graph showing the damping force characteristics of the hydraulic damper.

FIGS. 9 through 12 show damping force characteristics of the hydraulic damper including the piston valves having the orifices (by-pass). It is noted that the inside diameter cross section area A of the cylinder is 1661.90 mm$^2$, an axis of abscissas indicates the moving speed (m/sec) of the piston, an axis of ordinate indicates the load (kN). In FIGS. 9 and 10, a flow area a of the orifice (by-pass) is 0.30 mm$^2$, FIG. 9 represents the case when the hydraulic damper moves in the contraction side and FIG. 10 represents the case when the hydraulic damper moves in the expansion side. In FIGS. 11 and 12, the flow area a of the orifice (by-pass) is 0.15 mm$^2$, FIG. 11 represents the case when the hydraulic damper moves in the contraction side and FIG. 12 represents the case when the hydraulic damper moves in the expansion side.

It is noted that the structure of the piston valve described above is not limited to that having the annular projection 45 and the valve seat plate 50 and may be constructed differently as long as it has the damping force characteristics described above such as what including a biased valve structure. Still further, the gas chamber (preload chamber) 29 is not limited to what into which nitrogen gas or the like is charged and may be what storing a spring having a high spring constant for example as long as it has a bias force enabling to absorb moves of the float member 23 by facing to the hydraulic pressure of the hydraulic chamber 27.

Still further, although the piston rod 6 penetrates only through the rod-side oil chamber 27$a$ in the embodiments described above, the piston rod 6 may penetrate through the non-rod-side oil chamber 27$b$ as well and may be supported by the float member 23. In this case, the spring 40 is not always necessary.

The above disclosure can be summarized as follows. As shown in FIGS. 1 through 3 for example, the structure vibration control device A includes the hydraulic damper 1 installed aslant between the one and other structural members 2 and 3. The hydraulic damper 1 includes the cylinder 5, the hydraulic chamber 27 provided in the cylinder 5 and in which oil is filled, and the piston 10 partitioning the hydraulic chamber 27 into the two oil chambers 27$a$ and 27$b$ between which the oil communicates with predetermined damping characteristics. One end of the piston rod 6 is connected the one structural member 2 and another end thereof is connected with the piston 10. An end 9 of the cylinder 5 is connected to the other structural member 3.

The cylinder 5 includes the end member 19 formed immovably at least in the axial direction, the float member 23 formed within the cylinder 5 movably in the axial direction and forming the hydraulic chamber 27 between the end member 19 and the float member 23, the preload chamber 29 having the bias force counteracting to the hydraulic pressure acting from the hydraulic chamber 27 to the float member 23 between the closing portion 9 at the end of the cylinder 5 and the float member 23, the first piston valve $37_1$ ($37_3$) provided on one side of the piston 10 and restricting the flow of the oil from the one oil chamber 27a to the other oil chamber 27b, and the second piston valve $37_2$ ($37_4$) provided on the other side of the piston 10 and restricting the flow of the oil from the other oil chamber 27b to the one oil chamber 27a as shown in FIG. 4A through 6C.

The first and second piston valves $37_1$ and $37_2$, ($37_3$ and $37_4$, and $37_5$ and $37_6$) have such damping force characteristics to the flow of the oil in the direction opposite to the restricted oil flow that resistance thereof to the flow of the oil is large in a state in which the moving speed V of the piston 10 with respect to the cylinder 5 is low and the resistance is small in a state in which the moving speed V of the piston 10 is fast.

Because the hydraulic damper 1 includes the preload chamber 29 in series with the hydraulic chamber 27 and the float member 23 moves by resisting against or following the bias force of the preload chamber 29 even if the oil in the hydraulic chamber 27 expands or contracts due to temperature change, it is possible to prevent the oil from leaking out of or air from being taken into the hydraulic chamber 27 and to maintain the performance of the hydraulic damper 1 over a long period of time by changing the volume of the hydraulic chamber 27 in response to the expansion or the contraction of the oil.

For instance, as shown in FIG. 8, the first and second piston valves $37_1$ and $37_2$, ($37_3$ and $37_4$) are located at the closed position and thereby limit the flow of the oil in the direction opposite to the flow restricted respectively by the piston valves by the gap of the piston valves or the orifice having the small opening area ratio for example in the state in which the moving speed (V) of the piston 10 with respect to the cylinder 5 is the predetermined value (P) or less and the hydraulic damper 1 functions approximately as the rigid body having the damping force characteristics in which the variation of the load with respect to the moving speed rises with the steep gradient (S).

The first and second piston valves $37_1$ and $37_2$ ($37_3$ and $37_4$) permit the flow of the oil in the direction opposite to the restricted flow by being opened in the state in which the moving speed (V) of the piston is faster than the predetermined value (P) and the hydraulic damper 1 is put into the vibration controlling state (T) having the small damping characteristics of the moderate gradient in which the variation of the load with respect to the moving speed is small.

While the first and second piston valves $37_1$ and $37_2$ ($37_3$ and $37_4$) are provided in the piston part, the hydraulic damper functions approximately as the rigid body whose resistance against the flow of the oil is large and whose damping force characteristics is large and the hydraulic damper mounted aslant between the structural members can effectively suppress the shaking of the structure in the case when the earthquake is weak and the moving speed of the piston is slow.

Still further, in the case when the earthquake is strong and the moving speed of the piston is fast, the hydraulic damper is put into the damping state in which the resistance against the flow of the oil between the both oil chambers is small and the damping force characteristics is small. Thus, the hydraulic damper can damp vibrations of the structure, prevent the mounted parts of the hydraulic damper from being damaged and effectively absorb the vibrations of the structure.

The hydraulic damper 1 has such damping force characteristics that the first and second piston valves $37_1$ and $37_2$ ($37_3$, $37_4$, and $37_5$ and $37_6$) are located at the closed position and thereby limit the flow of the oil in the direction opposite to the flow restricted by the piston valves in the state in which the moving speed of the piston with respect to the cylinder is the predetermined value (P) or less and the variation of the load with respect to the moving speed rises with the steep gradient of 150 to 800 kN/(m/sec), and the first and second piston valves $37_1$ and $37_2$ are opened and thereby permit the flow of the oil in the state in which the moving speed of the piston is faster than the predetermined value and the variation of the load with respect to the moving speed rises less with the moderate gradient.

The structure vibration control device using the hydraulic damper of the invention can suppress or damp the vibrations of the structure in response to the magnitude of the earthquake. The hydraulic damper can maintain its performance regardless of a change of environmental temperature and can reduce damages of the structure otherwise caused by the earthquake for a long period of time.

The piston 10 is provided with the orifice 61 communicating the two oil chambers 27a and 27b and having the very small flow area such that the opening area ratio is within the range of 0.004 to 0.040. Thereby, the hydraulic damper can stably hold the damping force characteristics of the steep gradient of 150 to 600 kN/(m/sec) in the state in which the moving speed of the piston is the predetermined value or less. If the value is 600 kN/(m/sec), the residual pressure is generated within the oil chambers and the vibration energy cannot be effectively absorbed.

As shown in FIG. 3 for example, the piston rod 6 extends from the piston 10 and penetrates through only one oil chamber 27a within the two oil chambers 27a and 27b in the hydraulic damper 1.

Because the piston rod extends in the hydraulic damper by penetrating through only one oil chamber, the structure of the hydraulic damper is simplified and the structure vibration control device using the reliable hydraulic damper can be provided. Still further, while the volume of the hydraulic chamber changes by the stroke of the piston because the piston rod lies only in one oil chamber, the volumetric change is absorbed by the preload chamber.

The spring 40 is disposed within the one oil chamber 27a through which the piston rod 6 penetrates by being contracted between the end member 19 and the piston 10 in the hydraulic damper 1.

Because the hydraulic damper 1 is configured such that the spring 40 is disposed within the one oil chamber 27a, the difference of the pressures based on the cross sectional area of the piston rod 6 acting on the piston 10 from the both oil chambers 27a and 27b is balanced by the spring 40, and the piston 10 is held around the center of the stroke of the hydraulic chamber 27 because the bias force from the preload chamber 29 is balanced with the bias force of the spring 40 and the length of the hydraulic damper 1 in the natural state is made constant. Thereby, the hydraulic damper 1 can be readily mounted to the structure, the performance as the structure vibration control device is stabilized, and can restore the structure to its original state by the recovery force to the neutral position of the hydraulic damper 1 even if the structure is deformed to a plastic deforming area by an earthquake for example.

The preload chamber is formed of the gas chamber 29 into which inert gas of the predetermined pressure is charged.

Because the preload chamber 29 is formed of the gas chamber into which the inert gas is discharged, the bias force counteracting to the hydraulic chamber 1 can be readily obtained by adjusting the gas pressure in the gas chamber.

The structure vibration control device further includes the cap member 7 configured to close one end portion of the cylinder 5, the scraper 30 provided in the cap member 7 to scrape adhesives of the piston rod, and a spare void 31 made between the cap member 7 and the end member 19 and having a length longer than the stroke of the hydraulic damper 1.

Because the spare void 31 having the length longer that the stroke of the hydraulic damper 1 is provided, the part of the piston rod 6 in slidable contact with the end member 19 is put into the state in which the adhesives such as dusts, rust and water are scraped by the scraper 30. Accordingly, it is possible to prevent the seal of the end member 19 otherwise from being damaged by the stroke of the hydraulic damper and the adhesive from entering the inside of the hydraulic chamber 27.

For instance, as shown in FIGS. 4 through 7, the first and second piston valves $37_1$ and $37_2$ ($37_3$ and $37_4$, and $37_5$ and $37_6$) include the annular projections 45 formed on the both side surfaces 10a and 10b of the piston 10 and having the circumference centering on the center axial line of the hydraulic damper 1, the flexible valve seat plate 50 biased such that the outer peripheral part thereof abuts against the projection 45, and the oil passages 47 and 49 communicating the both side surfaces of the piston 10 at the outer and inner diameter sides of the projections 45.

In the case when the moving speed of the piston 10 is the predetermined value (P) or less, the valve seat plate 50 substantially abuts against the annular projection 45 at around the entire circumference and limits the oil flowing through the oil passage.

In the case when the moving speed of the piston 10 exceeds the predetermined value (P), the valve seat plate 50 deflects by resisting against the bias force, separates from the annular projection 45 at around the entire circumference thereof, and suddenly permits the oil to flow through the oil passages.

The first and second piston valves $37_3$ and $37_4$ can be simply constructed by the projections, the valve seat plates, the disc springs, and the oil passages. Still further, it is possible to assure the flow area of the oil, to switch the steep gradient to the moderate gradient at once, and to readily and reliably obtain the desirable damping force characteristic.

As shown in FIGS. 6A through 6C for instance, the valve seat plate 50 is composed of the plurality of sheets of plates, and at least one groove 61a cut into from the outer diameter side is formed at least in one sheet 50a of the plurality of valve seat plates as the orifice 61 communicating the inner diameter side with the outer diameter side of the annular projection 45.

It is possible to readily form the orifice having the small flow area with high degree of freedom by forming the grove to the plurality of valve seat plates and to readily provide the hydraulic damper having the orifice corresponding to characteristics of the building within the range of the opening area ratio.

As shown in FIG. 7 for example, the piston 10 includes the hydraulic spaces 46l and 46r respectively on the both side surfaces of the piston 10' between the annular projection 45 and the boss portion 44 to which the piston rod 6 of the piston 10' is fittingly inserted.

One ends of the oil passages 47 and 49 whose other ends communicate respectively with the outer diameter side of the annular projection 45' are made to communicate with the both hydraulic spaces 46l and 46r.

The projection height (H) of the annular projection 45' on the both side surfaces 10'a and 10'b is heightened as compared to the projection height (h) of the boss portion 44 (H>h) such that the valve seat plate 50 abuts against the annular projection 45' with the predetermined preload.

It is possible to switch the damping force characteristics of the first and second piston valves $37_5$ and $37_6$ adequately at the predetermined value by exerting a preload to the valve seat plates.

As shown also in FIG. 7 for example, the valve seat plates 50 are attached to the both side surfaces 10'a and 10'b of the piston 10' between the boss portion 44 and the valve seat plates 50 through an intermediary of a predetermined number of spacers 55.

It is possible to readily adjust the preload of the valve seat plates by adjusting the number or thickness of the spacers and to adequately adjust the hydraulic damper according to the strength, structure and vibration characteristics and other of the structure such as a building.

While the present invention has been described above with reference to the exemplary embodiments, it is to be understood that the present invention is not limited to the disclosed exemplary embodiments. The scope of the following Claims is to be accorded the broadest interpretation so as to encompass all such modifications and equivalent configurations and functions.

What is claimed is:

1. A building vibration control device comprising:
a hydraulic damper installed between a first structural member of a building and a second structural member of the building, the hydraulic damper including:
 a cylinder, an end of the cylinder being connected to the first structural member;
 a hydraulic chamber provided in the cylinder and filled with oil;
 a piston partitioning the hydraulic chamber into a first oil chamber and a second oil chamber, and fitting movably within the cylinder;
 a piston rod connected with the piston,
 an end of the piston rod being connected to the second structural member;
 an end member being fitted oil-tightly within the cylinder, the end member being fixed so as not to move in an axial direction of the cylinder;
 a float member formed within the cylinder movably in the axial direction, the float member forming the hydraulic chamber with the end member;
 a preload chamber formed between a closing portion closing the end of the cylinder and the float member, the preload chamber having a bias force counteracting a hydraulic pressure acting from the hydraulic chamber to the float member;
 a first piston valve provided on one side of the piston, being normally biased to be closed, and restricting the oil from flowing from the first oil chamber to the second oil chamber, the first piston valve being closed so as to limit the oil from flowing from the second oil chamber to the first oil chamber such that a load with respect to a moving speed of the piston varies from 150 to 800 kN/(m/sec) in a state in which the moving speed of the piston within the cylinder is less than a first predetermined value, and being opened so as to permit the oil to flow from the second oil chamber to the first oil chamber in a state in which the moving speed of the piston is faster than the first predetermined value, and a second piston valve provided on another side of the piston, being biased to be closed, and restricting the oil from flowing from the second oil chamber to the first oil chamber, the second piston valve being closed so as to limit the oil from flowing from the first oil chamber to the second oil chamber such that the load with respect to the moving speed of the piston varies from 150 to 800 kN/(m/sec) in a state in which the moving speed of the piston within the cylinder is less than a second predetermined value, and being opened so as to permit the oil to flow from the first oil chamber to the second oil chamber in a state in which the moving speed of the piston is faster than the second predetermined value.

2. The building vibration control device according to claim 1, wherein at least one of the first piston valve and the second piston valve further includes an orifice communicating the first oil chamber and the second oil chamber, wherein the first piston valve exhibits such damping force characteristics that the variation of the load with respect to the moving speed of the piston within the cylinder ranges from 150 to 600 kN/(m/sec) in the state in which the flow of the oil is limited in the state in which the moving speed of the piston is less than the first predetermined value, and wherein the second piston valve exhibits such damping force characteristics that the variation of the load with respect to the moving speed of the piston within the cylinder ranges from 150 to 600 kN/(m/sec) in the state in which the flow of the oil is limited in the state in which the moving speed of the piston is less than the second predetermined value.

3. The building vibration control device according to claim 1, wherein the piston rod extends from the piston and penetrates through only the first oil chamber in the hydraulic damper.

4. The building vibration control device according to claim 3, wherein the hydraulic damper further includes a spring disposed within the first oil chamber through which the piston rod penetrates by being contracted between the end member and the piston.

5. The building vibration control device according to claim 1, wherein the preload chamber is formed of a gas chamber into which inert gas with a predetermined pressure is charged.

6. The building vibration control device according to claim 1, further comprising:
a cap member configured to close one end portion of the cylinder;
a scraper provided in the cap member to scrape adhesives attached to the piston rod; and
a spare void provided between the cap member and the end member and having a length which is longer than a stroke of the hydraulic damper.

7. The building vibration control device according to claim 2, wherein the first piston valve includes:
an annular projection formed on one of side surfaces of the piston and formed of a circumference centering on a center axial line of the hydraulic damper;
a flexible valve seat plate biased such that an outer peripheral part thereof abuts against the annular projection; and
an oil passage communicating both side surfaces of the piston at one of an outer diameter side and an inner diameter side of the annular projection;
wherein the valve seat plate substantially abuts against the annular projection by its entire circumference and restricts the oil from flowing through the oil passage when the moving speed of the piston is the first predetermined value or less; and
wherein the valve seat plate deflects by resisting against its own bias force, separates from the annular projection at its entire circumference, and permits the oil to flow through the oil passage at once when the moving speed of the piston exceeds the first predetermined value; and
wherein the second piston valve includes:
an annular projection formed on the other of the side surfaces of the piston and formed of a circumference centering on the center axial line of the hydraulic damper;
a flexible valve seat plate biased such that an outer peripheral part thereof abuts against the annular projection; and
an oil passage communicating both side surfaces of the piston at the other of the outer diameter side and the inner diameter side of the annular projection;
wherein the valve seat plate substantially abuts against the annular projection by its entire circumference and restricts the oil from flowing through the oil passage when the moving speed of the piston is the second predetermined value or less; and
wherein the valve seat plate deflects by resisting against its own bias force, separates from the annular projection at its entire circumference, and permits the oil to flow through the oil passage at once when the moving speed of the piston exceeds the second predetermined value.

8. The building vibration control device according to claim 2, wherein the first piston valve includes:
an annular projection formed on one of the side surfaces of the piston and formed of a circumference centering on a center axial line of the hydraulic damper;
a flexible valve seat plate biased such that an outer peripheral part thereof abuts against the annular projection; and
an oil passage communicating both side surfaces of the piston at one of an outer diameter side and an inner diameter side of the annular projection;
wherein the valve seat plate substantially abuts against the annular projection by its entire circumference and restricts the oil from flowing through the corresponding oil passage when the moving speed of the piston is the first predetermined value or less;
wherein the valve seat plate deflects by resisting against its own bias force, separates from the annular projection at its entire circumference, and permits the oil to flow through the oil passage at once when the moving speed of the piston exceeds the first predetermined value;
wherein the second piston valve includes:
an annular projection formed on the other of the side surfaces of the piston and formed of a circumference centering on the center axial line of the hydraulic damper;

a flexible valve seat plate biased such that an outer peripheral part thereof abuts against the annular projection; and an oil passage communicating both side surfaces of the piston at the other of the outer diameter side and the inner diameter side of the annular projection;

wherein the valve seat plate substantially abuts against the annular projection by its entire circumference and restricts the oil from flowing through the oil passage when the moving speed of the piston is the second predetermined value or less; and wherein the valve seat plate deflects by resisting against its own bias force, separates from the annular projection at its entire circumference, and permits the oil to flow through the oil passage at once when the moving speed of the piston exceeds the second predetermined value; and wherein the orifice communicating the outer diameter side and the inner diameter side of the annular projection is formed of at least one groove cut in from the outer diameter side of at least one valve seat plate of a plurality of valve seat plates.

9. The building vibration control device according to claim 8, wherein an opening area ratio of the orifice which is a ratio of a flow area of the orifice with respect to an inside diameter sectional area of the cylinder is in a range of 0.004 to 0.040.

10. The building vibration control device according to claim 7, wherein each of the first piston valve and the second piston valve includes:

a boss portion formed in the piston and into which the piston rod of the piston is fittingly inserted and a hydraulic space formed on one of the side surfaces of the piston between the annular projection and the boss portion, wherein, for each of the first piston valve and the second piston valve:

the oil passage includes one end communicating with the hydraulic space formed on the one of the side surfaces of the piston and another end communicating with the outer diameter side of the annular projection formed on the other of the side surfaces of the piston, and a projection height of the annular projection on the corresponding side surface of the piston is heightened as compared to a projection height of the boss portion such that the valve seat plate abuts against the annular projection with a predetermined preload.

11. The building vibration control device according to claim 10, wherein, for each of the first piston valve and the second piston valve:

at least one spacer is provided between the boss portion and the valve seat plate, and the valve seat plate is attached to the corresponding side surface of the piston through an intermediary of the at least one spacer.

12. The building vibration control device according to claim 1, wherein the hydraulic damper is installed aslant between the first structural member of the building and the second structural member of the building.

* * * * *